Patented Jan. 30, 1934

1,945,310

UNITED STATES PATENT OFFICE 1,945,310

ESTERIFICATION OF CELLULOSE AND CELLULOSIC MATERIAL

Robert E. Fothergill and Frederick C. Hahn, Wilmington, Del., assignors to E. I. du Pont de Nemours & Company, Wilmington, Del., a corporation of Delaware No Drawing. Application May 25, 1932
Serial No. 613,550

20 Claims. (Cl. 260—101)

This invention relates to the preparation of cellulose esters, and more particularly to the preparation of esters from cellulosic material and an acylating agent, in the presence of a volatile monobasic mineral acid of the halogen group as a medium for the reaction.

The use of halogen acids in small amounts as catalysts to promote the esterification of cellulose is not new, but, in the known prior art, no one has disclosed the use of a halogen acid in substantial amount as the reaction medium in the esterification of cellulose.

This invention has as an object to provide a new and useful process for the esterification of cellulose, wherein reduced amounts of acylating agent are used and certain operations are eliminated which are practiced in commonly employed procedures. These advantages and further objects of this invention are fully disclosed in the description of the invention which follows:

By this process useful cellulose esters are prepared by esterifying cellulosic material in the presence of highly concentrated or anhydrous hydrohalogen acids and particularly hydrofluoric acid in amount equal to or greater than the weight of cellulosic material used.

This invention is illustrated, but not limited, by the following examples, in which parts are by weight:

Example I

Five parts of oven-dry cotton linters are added to a mixture of 25 parts of anhydrous hydrofluoric acid, 9.5 parts of acetic anhydride and 10 parts of glacial acetic acid which has previously been cooled to 0° C. and rapidly mixed together at 0°. After one minute, the cooling bath is removed and the reaction allowed to proceed with occasional stirring and with no external cooling. At the end of two or three minutes the cotton is completely in solution and at the end of ten minutes the viscous solution is poured into water to precipitate the cellulose acetate. The precipitated acetate is washed free of acid and dried. This acetate contains about 58% combined acetic acid and forms clear solutions of high viscosity in both chloroform and acetone. Films cast from these solutions are clear and flexible.

Example II

One part of oven-dry cotton linters is mixed rapidly into a solution of 2.5 parts of acetic anhydride in 7.5 parts of anhydrous hydrofluoric acid previously cooled to below 0° C., and after 5 minutes reaction time with no external cooling the clear solution is precipitated in water. The washed and dried cellulose acetate resulting from this procedure forms low viscosity solutions in both acetone and chloroform.

Example III

One part of oven-dry cotton linters is mixed rapidly into a mixture previously cooled to below 0° C. of 5 parts of hydrofluoric acid, 2.5 parts of acetic anhydride, and 2.5 parts of diethyl ether. In one or two minutes the cotton is completely dissolved and at the end of three minutes the resulting cellulose acetate is precipitated by pouring the solution into water. This acetate is soluble in acetone, but forms grainy solutions in chloroform.

Example IV

Ten parts of oven-dry cotton linters are stirred into a mixture of 60 parts of hydrofluoric acid, 30 parts of acetic anhydride and 20 parts of glacial acetic acid, which has previously been cooled to 0° C. After a period of 5 minutes reaction time (cooled by ice bath during the entire reaction) the viscous solution is precipitated by pouring it into about 250 parts of diethyl ether. The precipitated acetate is washed several times with fresh portions of ethyl ether and finally with water and then dried. The resulting cellulose acetate is insoluble in acetone (due to the higher ratio of anhydride to cellulose used) but forms clear solutions of high viscosity in chloroform. A film prepared from a chloroform solution of this product is very flexible.

Example V

Five parts of oven-dry cotton linters are treated with an esterifying bath consisting of 25 parts of hydrofluoric acid, 10 parts of acetic anhydride and 10 parts of butyric acid in exactly the same method as described in Example I. The resulting cellulose acetobutyrate is soluble in acetone, chloroform, and a benzene-10% ethyl alcohol mixture. Good films can be prepared from these solutions.

Example VI

A cellulose acetolaurate is obtained by treating five parts of oven-dry cotton linters with an esterifying bath composed of 25 parts of hydrofluoric acid, 10 parts of acetic anhydride, and 10 parts of lauric acid, according to the method described in Example I. The resulting esterification mixture is poured into excess water and the precipitated cellulose ester washed first with water and finally with methanol. This cellulose acetolaurate is soluble in acetone and chloroform and is swollen in benzene and benzene-alcohol mixtures.

Example VII

A cellulose caproate-heptoate is obtained by mixing 5 parts of oven-dry linters with 25 parts of hydrofluoric acid and 30 parts of a mixture of the anhydrides of fatty acids containing 6 to 7 carbon atoms. The cellulose is completely dissolved at the end of two minutes reaction at 0° C. The reaction is allowed to proceed for six more minutes with no external cooling and the resulting clear solution is poured into methanol to coagulate the mixed ester. This ester is difficultly wet by water and somewhat sticky. It is soluble in acetone, chloroform, and benzene and good films are obtained from a benzene-xylene mixture. Films cast from chloroform solutions of this ester adhere very strongly to glass.

Example VIII

One part of oven-dry cotton linters is stirred into a solution of 2.7 parts of phthalic anhydride in 5 parts of hydrofluoric acid. In one minute a clear solution is formed which is coagulated by pouring into water immediately. The resulting cellulose phthalate is soluble in dilute alkali and reprecipitated by acid. This ester is insoluble in the ordinary organic solvents.

Example IX

One-half part of oven-dry cotton is placed in a mixture of 10 parts of hydrofluoric acid and about 4 parts of fuming nitric acid for a period of 5 minutes at room temperature. The cotton does not soften or dissolve in this mixture during this reaction time. The fibrous product is removed and washed thoroughly and dried. The resulting nitrocellulose forms a very clear solution of very high viscosity in a solvent mixture composed of 25% (by weight) Star solvent, 25% butyl acetate, 10% butyl alcohol, 20% toluene and 20% xylene.

Example X

Twenty parts of oven-dry cotton linters are mixed rapidly into a solution of 100 parts of hydrofluoric acid and 80 parts of glacial acetic acid at 0° C. in a suitable container fitted with a mechanical stirrer. Ketene is then passed into the reaction mixture at a rate of about 63 parts per hour. The temperature of the reaction mixture is held at about 20° C. during this reaction. At the end of 45 minutes the clear reaction solution is poured into water to precipitate the cellulose acetate. This cellulose acetate is soluble in both acetone and chloroform.

Example XI

Five parts by weight of oven-dry monoethyl cellulose are added to a mixture of 25 parts of anhydrous hydrofluoric acid, 5.4 parts of acetic anhydride and 10 parts of glacial acetic acid which has previously been cooled to 0° C., and rapidly mixed together at 0° C. After one minute the cooling bath is removed and the reaction allowed to proceed with occasional stirring and with no external cooling. At the end of two or three minutes the ethyl cellulose is completely in solution and at the end of ten minutes the viscous solution is poured into water to precipitate the ethyl cellulose acetate. The precipitated ether ester is washed free of acid and dried. This ethyl cellulose acetate contains about 9% ethyl and about 28% acetyl groups and forms clear solutions in both chloroform and acetone. Films cast from these solutions are clear and flexible. Ethyl cellulose propionate may be made in the same manner using 6.5 parts of propionic anhydride and 13 parts of propionic acid.

Example XII

One part by weight of a low nitrated cellulose containing 4 per cent nitrogen is added to a mixture of 2.5 parts of acetic anhydride, 5.0 parts of anhydrous hydrofluoric acid, and 2.0 parts of acetic acid, all previously cooled to 0° C. and after 5–10 minutes with no further external cooling the clear solution is precipitated in water. The washed and dried cellulose acetate nitrate dissolves to a clear solution in chloroform-alcohol mixture.

This esterification process is a general method for the preparation of cellulose esters of all types: for example, cellulose esters of unsaturated or saturated aliphatic acids, aromatic acids, heterocyclic or alicyclic acids and inorganic acids or mixtures of any of these. As examples of cellulose esters which can be made by this process, there may be cited the acetate, proprionate, butyrate, caproate, heptoate, laurate, stearate, oleate, palmitate, erucate, linoleate, benzoate, naphthoate diphenate, naphthalate, adipate, suberate, succinate, abietate, naphthenate, furoate, cinnamate, quinolinate, levulinate, glutarate, sebacate, maleate, fumarate, phthalate, acrylate, crotonate, nitrate, etc., or mixed esters containing two or more of the above radicals, e. g., acetate-nitrate, acetate-propionate, acetate-laurate, caproate-heptoate, etc.

The hydrofluoric acid used should be practically anhydrous, and acid of 99.0 to 100.0% purity is preferred, although acids of slightly lower concentrations, say 96 to 99% may be used. However, it is not so economical to use these weaker acids because an extra amount of anhydride, equivalent to the extra amount of water present in the weaker acid, would be required.

The qauntity of hydrofluoric acid necessary to esterify cellulose according to this method may vary over rather wide limits. The use of one part of hydrofluoric acid to one part of cellulose will produce only a very slight esterification in 22 hours at room temperature. The use of 7.5 parts of hydrofluoric acid to one part of cellulose causes such a rapid esterification that the resulting ester is considerably degraded. Best results are obtained when about 5 parts of hydrofluoric acid to one part of cellulose are used and with this proportion a very rapid but smooth esterification occurs (2 to 10 minutes being generally sufficient). When the ratio of hydrofluoric acid to cellulose is as low as approximately 3 to 1 the reaction proceeds more slowly to a uniform degree of esterification. This is sometimes desirable in order to control other properties of the cellulose ester such as viscosity. When the ratio is 6 to 1, the process while rapid is still capable of control to yield esters which are not so far degraded as to have undesirable properties such as extremely low viscosity, brittleness of films, etc. The preferred range is from 4 to 6 parts by weight of hydrogen fluoride to 1 part by weight of dry cellulose.

The experimental conditions, such as time and temperature of reaction, depend on several factors. The temperature of reaction is preferably maintained at between 0° C. and room temperature (25–30° C.). Higher temperatures may be used, but they cause greater degrading action on the cellulose. Lower temperatures than 0° C.

may be used if a decreased rate of reaction is desired. The time of reaction depends on the amounts of hydrofluoric acid and diluent used; also, on the temperature of the reaction. Periods varying from one minute to 24 hours may be used but periods of from 2 to 15 minutes are preferable. This high rate of reaction makes this hydrofluoric acid esterification process easily adaptable to a continuous process.

The esterification may be performed without any diluent present but the reaction is more easily controlled by the use of a suitable diluent such as the organic acid corresponding to the anhydride if simple esters are desired, or an organic acid differing from the acid from which the anhydride is derived if mixed esters are desired. Other organic solvents which are miscible with, and do not react with hydrofluoric acid may be used, such as esters or ethers. The use of liquids such as benzene and tetrachloroethane which are not soluble in the esterifying mixture results in the preparation of cellulose esters which are not uniform. Inorganic solvents such as liquid sulfur dioxide may also be used in this process.

Other hydrohalogen acids may be used, for example liquefied hydrogen chloride, hydrogen bromide or hydrogen iodide alone or in solution in inert solvents such as the dimethyl ether of ethylene glycol, dioxane, ethyl acetate, etc. Due to the volatility of these hydrohalogen acids, esterifications in the liquefied acids are carried out at low temperatures and/or high pressures. Due to the more highly corrosive nature of these acids with the attendant difficulties in apparatus, it is preferred to use hydrofluoric acid.

The acylating agent may be an organic acid anhydride such as acetic anhydride, propionic anhydride, or butyric anhydride or a ketene, preferably in the presence of an organic acid, or it may be an acid like nitric acid. In some cases, an acid halide such as acetyl chloride may be used. The quantity of acylating agent required is only that theoretically equivalent to the acyl content of the desired cellulose ester. Of course, this quantity of acylating agent must be increased by an amount necessary to react with the water in the various reagents. Increase of anhydride causes a higher degree of acylation in general. In the case of acetic anhydride this results in the formation of acetone-insoluble cellulose acetate.

The cellulosic material which may be used in the proces is not limited to cellulose per se, i. e., purified wood pulp, bagasse pulp, waste rayon, hydrocellulose, oxycellulose, purified cellophane scrap cotton linters, etc., but also includes incompletely substituted cellulose derivatives such as the ethers, lower esters or, in general, any derivative of cellulose in which there remain esterifiable hydroxyl groups. Thus, mixed ether esters such as methyl cellulose laurate, ethyl cellulose nitrate, ethyl benzyl cellulose acetate, benzyl cellulose propionate, ethyl cellulose acetate propionate, crotyl cellulose crotonate, etc., may be made by esterifying cellulose ethers such as the methyl, ethyl, crotyl, butyl, hydroxyethyl, ethyl benzyl, lauryl, etc., with one or more acylating agents by the methods of this invention as shown in Example XI. Mixed esters may be made as shown in Examples V, VI and VII, but may also be made by reacting an incompletely acylated cellulose ester with at least one other acylating agent by the process of this invention as is shown in Example XII. Thus, partially acetylated, nitrated butyrylated, benzoylated, propionylated, etc., cellulose can be esterified further with other acylating agents using the process of this invention. The process may also be applied to increase the esterification by one and the same acid by acylating with an agent containing the radical already present in the incompletely acylated ester.

The cellulose may be pretreated by any known process for pretreatment for esterification, but this pretreatment is not necessary to obtain satisfactory results. Air-dry cellulose may be used, but for economical reasons it is preferable to use cellulose that has been dried in an oven to a low moisture content.

This process may be carried out in any type of apparatus which will give rapid and thorough mixing of the material. Equipment for carrying out either a continuous or a batch process is suitable. The apparatus is equipped with suitable cooling devices for controlling the temperature and rate of reaction.

After completion of the reaction hydrofluoric acid may be removed in large part by distillation, preferably at low temperatures, for example, under reduced pressure. The cellulose ester solution in hydrofluoric acid may be precipitated by means of water, but the precipitation is preferably carried out with anhydrous liquids miscible with hydrofluoric acid which are non-solvents for the cellulose ester. Some of the precipitating agents which may be used are diethyl ether, methanol, ethanol, etc. This has the advantage of facilitating the recovery of the hydrofluoric acid which may be recovered from the mixtures by fractional distillation.

Cellulose esters produced according to this process may be used for any of the purposes for which cellulose esters are now used, such as for lacquers or other coating composition, films, artificial fibers, plastics, coated fabrics, safety glass, adhesives, etc.

An advantage of this esterification process is its great speed of reaction. This action of anhydrous hydrofluoric acid in bringing about rapid esterification is not analogous to that of sulfuric acid or catalysts in ordinary esterification processes. The replacement of hydrofluoric acid with equal amounts of anhydrous sulfuric, phosphoric, or hydrochloric acids does not produce such satisfactory esterification. The use of small amounts (a few per cent of the weight of the cellulose) of hydrofluoric acid as a catalyst as described in the prior art will not produce the results described in this invention. This high rate of esterification is not obtained until a quantity of hydrofluoric acid considerably in excess of the quantity of cellulose is used. This result is not obvious from the disclosures made in the prior art.

Another advantage is that a cellulose ester having any desired acyl content can be prepared directly by this process. In ordinary practice, a useful cellulose acetate is produced by acetylating cellulose to a triacetate and then hydrolyzing this primary acetate back to the desired acetyl content. The method described in this invention will give a useful cellulose acetate directly without requiring any hydrolysis step and thus the time required for the production of the cellulose ester is shortened, and the quantity of acetate anhydride required is decreased.

Having now particularly described and ascertained the nature of our invention, and in what manner the same is to be performed, we declare that what we claim is:

1. The process of preparing cellulose esters, which comprises reacting cellulosic material represented by the general formula $$C_6H_7O_2\begin{matrix}(OH)x\\(OR)y\end{matrix},$$

where $x$ is 1-3, $y$ is 0-2, and R is alkyl or acyl, with an acylating agent in the presence of a substantially anhydrous hydrohalogen acid in amount not less than the weight of cellulosic material used.

2. The process of preparing cellulose esters, which comprises reacting cellulosic material with an acylating agent in the presence of substantially anhydrous hydrofluoric acid in amount not less than the weight of cellulose material used, said cellulosic material being selected from the class consisting of cellulose, cellulose ethers and cellulose esters and containing at least one esterifiable hydroxyl group.

3. The process of preparing cellulose esters, which comprises reacting cellulosic material with an acylating agent in the presence of substantially anhydrous hydrofluoric acid in amount equal to three to six times the weight of cellulosic material used, said cellulosic material being selected from the class consisting of cellulose, cellulose ethers and cellulose esters and containing at least one esterifiable hydroxyl group.

4. The process of preparing cellulose esters, which comprises reacting cellulosic material with an acylating agent in the presence of substantially anhydrous hydrofluoric acid in amount equal to four to six times the weight cellulosic material used, said cellulosic material being selected from the class consisting of cellulose, cellulose ethers and cellulose esters and containing at least one esterifiable hydroxyl group.

5. The process of preparing cellulose esters which comprises reacting cellulose with an acylating agent in the presence of substantially anhydrous hydrofluoric acid in amount equal to four to six times the weight of cellulose used.

6. The process of preparing cellulose esters which comprises reacting cellulose with an anhydride of an organic acid in the presence of substantially anhydrous hydrofluoric acid in amount equal to four to six times the weight of cellulose used.

7. The process of preparing cellulose esters which comprises reacting cellulose with an anhydride of an organic acid and an organic acid in the presence of substantially anhydrous hydrofluoric acid in amount equal to four to six times the weight of cellulose used.

8. The process of preparing cellulose esters which comprises reacting cellulose with an organic acid and an anhydride of an organic acid derived from an organic acid having a different number of carbon atoms, in the presence of substantially anhydrous hydrofluoric acid in amount equal to four to six times the weight of cellulose used.

9. The process of preparing cellulose esters which comprises reacting an incompletely esterified cellulose ester with an acylating agent in the presence of substantially anhyrous hydrofluoric acid in amount equal to four to six times the weight of cellulose ester used.

10. The process of preparing mixed cellulose esters which comprises reacting an incompletely esterified cellulose ester with an acylating agent containing an acid radical other than that present in the cellulose ester in the presence of substantially anhydrous hydrofluoric acid in amount equal to four to six times the weight of cellulose ester used.

11. The process of preparing mixed cellulose esters which comprises reacting an incompletely esterified cellulose ester with an anhydride of an organic acid in the presence of substantially anhydrous hydrofluoric acid in amount equal to four to six times the weight of cellulose ester used.

12. The process of preparing cellulose ether esters which comprises reacting a cellulose ether with an acylating agent in the presence of substantially anhydrous hydrofluoric acid in amount equal to four to six times the weight of cellulose ether employed.

13. The process of preparing ethyl cellulose esters which comprises reacting ethyl cellulose with an acylating agent in the presence of substantially anhydrous hydrofluoric acid in amount equal to four to six times the weight of the ethyl cellulose used.

14. The process of preparing ethyl cellulose esters which comprises reacting ethyl cellulose with an anhydride of an organic acid in the presence of substantially anhydrous hydrofluoric acid in amount equal to four to six times the weight of the ethyl cellulose used.

15. The process of preparing mixed cellulose esters, which comprises reacting cellulosic material with mixtures of acylating agents in the presence of substantially anhydrous hydrofluoric acid in amount equal to four to six times the weight of cellulosic material used, said cellulosic material being selected from the class consisting of cellulose, cellulose ethers and cellulose esters and containing at least one esterifiable hydroxyl group.

16. The process of preparing cellulose acetate-propionate which comprises reacting cellulose with acetic anhydride and propionic acid in the presence of substantially anhydrous hydrofluoric acid in amount equal to four to six times the weight of cellulose used.

17. The process of preparing cellulose esters, which comprises reacting cellulosic material with an acylating agent in the presence of a substantially anhydrous hydrofluoric acid and a diluent therefor, the acid being in amount equal to four to six times the weight of cellulosic material used, said cellulosic material being selected from the class consisting of cellulose, cellulose ethers and cellulose esters and containing at least one esterifiable hydroxyl group.

18. The process of preparing acetone-soluble cellulose acetate direct, which comprises reacting cellulose with acetic anhydride or a mixture of acetic anhydride and glacial acetic acid in the presence of substantially anhydrous hydrofluoric acid in amount not less than the weight of cellulosic material used.

19. Cellulose esters prepared by esterifying cellulosic material with an acylating agent in the presence of a substantially anhydrous hydrohalogen acid in amount not less than the weight of cellulosic material used, said cellulosic material being selected from the class consisting of cellulose, cellulose ethers and cellulose esters and containing at least one esterifiable hydroxyl group.

20. Cellulose esters prepared by esterifying cellulose with an acylating agent in the presence of substantially anhydrous hydrofluoric acid in amount not less than three to six times the weight of cellulosic material used.

ROBRT E. FOTHERGILL.
FREDERICK C. HAHN.